United States Patent [19]
Fry et al.

[11] Patent Number: 5,463,753
[45] Date of Patent: Oct. 31, 1995

[54] METHOD AND APPARATUS FOR REDUCING NON-SNOOP WINDOW OF A CACHE CONTROLLER BY DELAYING HOST BUS GRANT SIGNAL TO THE CACHE CONTROLLER

[75] Inventors: Walter G. Fry; Jeff W. Wolford, both of Spring, Tex.

[73] Assignee: Compaq Computer Corp., Houston, Tex.

[21] Appl. No.: 955,501

[22] Filed: Oct. 2, 1992

[51] Int. Cl.[6] .................................................. G06F 13/14
[52] U.S. Cl. .................................. 395/473; 364/DIG. 1; 364/238.4; 364/240.5; 395/281; 395/285; 395/494; 395/445
[58] Field of Search ............................. 395/425, 400; 364/200 MS File, 900 MS File

[56] References Cited

U.S. PATENT DOCUMENTS

| | | | |
|---|---|---|---|
| 4,261,034 | 4/1981 | Saccomano et al. | 395/275 |
| 4,571,672 | 2/1986 | Hatada et al. | 395/425 |
| 4,920,486 | 4/1990 | Nielsen | 395/325 |
| 4,965,801 | 10/1990 | DuLac | 371/40.1 |
| 4,987,529 | 1/1991 | Craft et al. | 395/325 |
| 5,008,817 | 4/1991 | Shibata et al. | 395/325 |
| 5,228,135 | 7/1993 | Ikumi | 395/425 |
| 5,293,603 | 3/1994 | MacWilliams et al. | 395/425 |

FOREIGN PATENT DOCUMENTS

| | | |
|---|---|---|
| 0426184 | 5/1991 | European Pat. Off. |
| 0486230 | 5/1992 | European Pat. Off. |
| 0497054 | 8/1992 | European Pat. Off. |
| 0503936 | 9/1992 | European Pat. Off. |

OTHER PUBLICATIONS

D. Bursky, Build SCSI Raid Systems to Boost Data Availability, Electronic Design, vol. 39, No. 5, Mar. 14, 1991, pp. 35–41.
82495XP Cache Controller/82490XP Cache RAM Data Manual, Intel Corp. 1991, pp. 1–7, 11–34, 43–92.

*Primary Examiner*—David L. Robertson
*Assistant Examiner*—Hiep T. Nguyen
*Attorney, Agent, or Firm*—Pravel, Hewitt, Kimball & Krieger

[57] ABSTRACT

A method and apparatus which reduces the non-snoop window of a cache controller during certain operations to increase host bus efficiency. The cache controller requires a bus grant signal to perform cycles and cannot snoop cycles after the bus grant signal has been provided until the cycle completes. Cache interface logic monitors the cache controller for cycles that require either the expansion bus or the local I/O bus. When such a cycle is detected, the apparatus begins the cycle and does not assert the bus grant signal to the cache controller. The cache controller thus believes that the cycle has not yet begun and is thus able to perform other operations, such as snooping other host bus cycles. During this time, the cycle executes. When the read data is returned or when the write data reaches its destination, the interface logic provides the bus grant cycle to the cache controller at an appropriate time. By delaying the bus grant signal in this manner, the non-snoop window is reduced.

10 Claims, 9 Drawing Sheets

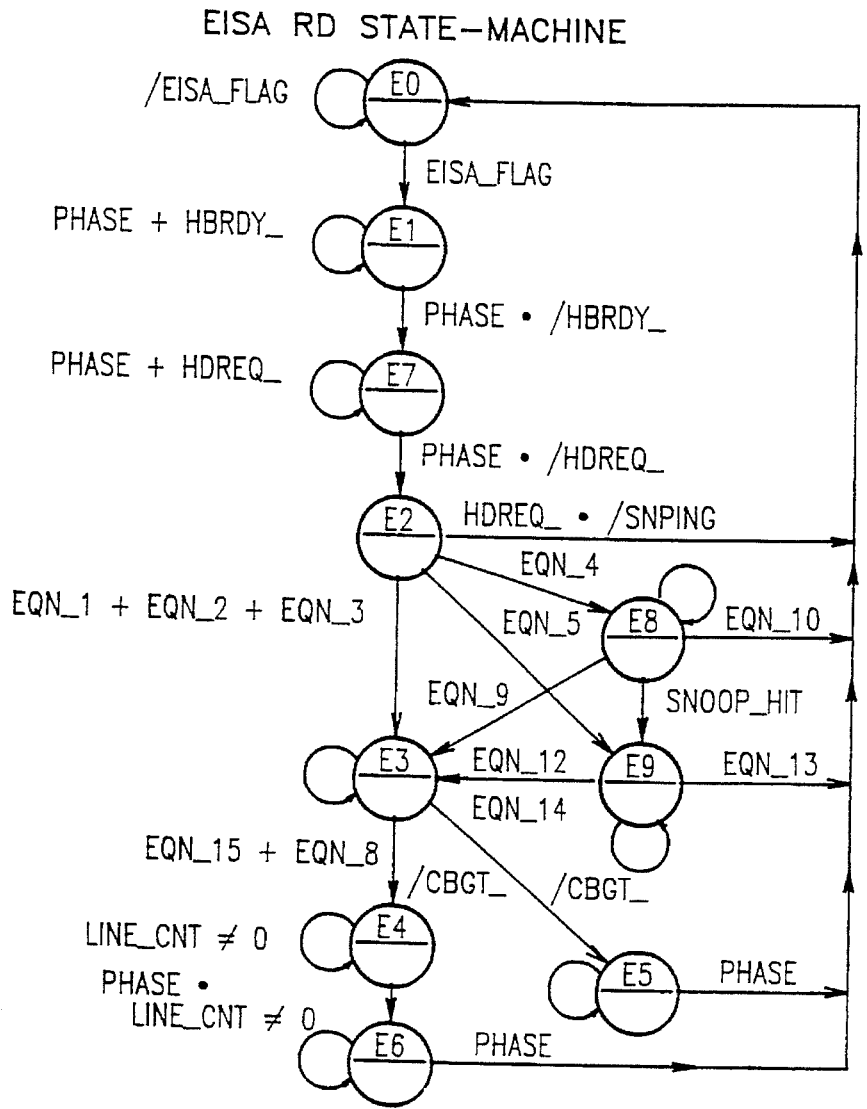

EISA RD STATE-MACHINE

EQN_1 = (HDREQ_ • TONE • /(SNPING + /CSNPBSY_) • CDTS)
EQN_2 = (HDREQ_ • (TTWO + ABORT_FLAG) • (LINE_CNT = 1) •
    /(SNPING + /CSNPBSY_) • CDTS_)
EQN_3 = (HDREQ_ • (LINE_CNT = 3) • /(SNPING + /CSNPBSY_) • /CDTS)
EQN_4 = (HDREQ_ • SNPING • /SNOOP_HIT)
EQN_5 = (HDREQ_ • SNPING • SNOOP_HIT)
EQN_6 = (PHASE • /(SNPING + /CSNPBSY_) • /CDTS_)
EQN_7 = ((TTWO + ABORT_FLAG) • (LINE_CNT =1))
EQN_8 = (LINE_CNT = 3)
EQN_9 = EQN_6 • (TONE + EQN_7 + EQN_8)
EQN_10 = EQN_6 • /(TONE + EQN_7 + EQN_8)
EQN_11 = (PHASE • /SNOOP_HIT • /CDTS_)
EQN_12 = EQN_11 • (TONE + EQN_7 + EQN_8)
EQN_13 = EQN_11 • /(TONE + EQN_7 + EQN_8)
EQN_14 = (TONE + (ABORT_FLAG • /CLEN1))
EQN_15 = (TTWO + (ABORT_FLAG • /CLEN1))

FIG. 4

CONCURRENT EISA READ
SNOOP WRITE-BACK W/SNOOP WINDOW REDUCTION

CONCURRENT EISA READ
SNOOP WRITE-BACK W/SNOOP WINDOW REDUCTION

CONCURRENT EISA READ
SNOOP WRITE-BACK W/SNOOP WINDOW REDUCTION

METHOD AND APPARATUS FOR REDUCING NON-SNOOP WINDOW OF A CACHE CONTROLLER BY DELAYING HOST BUS GRANT SIGNAL TO THE CACHE CONTROLLER

FIELD OF THE INVENTION

The present invention relates to microprocessor cache systems in computer systems, and more particularly to a method and apparatus for reducing the time period during which a cache system is prevented from snooping the host bus to increase host bus utilization by other devices.

DESCRIPTION OF THE RELATED ART

Currently, most computer systems utilize two or more buses to interconnect the various components comprising the system. In one popular type of computer system, the processor or processors are connected to a processor/memory bus, commonly called a host bus, and the host bus is in turn coupled to an input/output bus or expansion bus. The expansion bus generally includes a number of slots for receiving optional add-in boards such as network interface cards, hard disk cards, or video cards. Other types of I/O devices such as the floppy disk logic, floppy disk controller, the keyboard controller, or various other types of peripherals may be connected to the expansion bus or optionally may be connected to a third bus, as necessary.

Modern personal computer systems generally include one or more processors and a microprocessor cache memory system for each processor. A cache memory is a small amount of very fast, and expensive, zero wait state memory which is used to store frequently used code and data. The cache system is interfaced between the respective processor and the host bus and is used to bridge the gap between fast processor cycle times and slow memory access times.

When a processor generates a read request and the requested data resides in its respective cache memory, then a cache read hit takes place, and the processor can obtain the data from the cache memory without having to access main memory. If the data is not in the cache memory, then a cache read miss takes place, and the memory request is forwarded to the system and the data is retrieved from main memory, as would normally be done if the cache system did not exist. On a cache miss, the data that is retrieved from memory is provided to the processor and is also written into the cache memory due to the statistical likelihood that this data will be requested again by the processor. Likewise, if a processor generates a write request, the write data can be written to the cache memory without having to access main memory over the host bus (in a write-back cache). This increases processor efficiency and reduces host bus utilization, allowing more bandwidth for other processors and bus masters.

An efficient cache system yields a high "hit rate," which is the percentage of cache hits that occur during all memory accesses. When a cache system has a high hit rate, the majority of memory accesses are services with zero wait states. Also, since a cache system is usually located on the local bus of the microprocessor, cache hits are serviced locally without requiring use of the host bus. Therefore, a processor operating out of its local cache memory has a much lower "bus utilization." This reduces system bus bandwidth used by the processor, making more bandwidth available for other bus masters. Also, a processor can operate out of its local cache memory when it does not have control of the system bus, thereby increasing the efficiency of the computer system.

Two principal types of cache systems are referred to as write-through cache systems and write-back cache systems. In write-through systems, write data from the processor is written into the cache and is also immediately written into main memory. This guarantees that the copy of data in the cache memory is coherent or consistent with the data in main memory. A drawback of write-through cache systems is that host bus utilization is required for each processor write.

In a write-back cache system, processor write data is only written into the cache memory, and the write data is only written back to main memory when another device requests the data. When processor write data is written only into the cache system, the data held in the corresponding location in main memory is referred to as stale or invalid data. The cache location is said to hold modified or dirty data. In write-back cache systems, the cache controller is required to watch or "snoop" the host bus during cycles by other bus masters, as described below.

Cache management is generally performed by a device referred to as a cache controller. A principal cache management policy is the preservation of cache coherency. Cache coherency refers to the requirement that any valid copy of data in a cache must be identical to (or actually be) the owner of that location's data. The owner of a location's data is generally defined as the respective location having the most recent version of the data residing in the respective memory location. The owner of data can be either an unmodified location in main memory, or a modified location in a write-back cache.

In computer systems where independent bus masters can access main memory, there is a possibility that a bus master, such as another processor, or a direct memory access controller, network or disk interface card, or video graphics card, might alter the contents of a main memory location that is duplicated in the cache memory. When this occurs, the cache memory is said to hold "stale" or invalid data. Problems would result if the processor inadvertently obtained this invalid data. In order to maintain cache coherency, it is necessary for the cache controller to monitor the host bus when the processor does not control the host bus to see if another bus master accesses main memory. This method of monitoring the bus is referred to as snooping.

The cache controller must also monitor the host bus during main memory reads by a bus master in a write-back cache design because of the possibility that a previous processor write may have altered a copy of data in the cache memory that has not been updated in main memory. This is referred to as read snooping. On a read snoop hit where the cache memory contains data not yet updated in main memory, the cache controller generally provides the respective data to main memory and to the requesting bus master.

The cache controller must also monitor the system bus during memory writes because the bus master may write to or alter a memory location that resides in the cache memory. This is referred to as write snooping. On a write snoop hit, the cache entry is either marked invalid by the cache controller, signifying that this entry is no longer correct, or the cache memory is updated along with main memory.

Therefore, when a bus master reads or writes to main memory in a write-back cache design, or writes to main memory in a write-through cache design, the cache controller must latch the system address and see if the main memory location being accessed also resides in the cache memory. If a copy of the data from this location does reside in the cache memory, then the cache controller takes the appropriate action depending on whether a read or write snoop hit has occurred. This prevents incompatible data from being stored in main memory and the cache memory, thereby preserving cache coherency.

The cache controller is required to generate read cycles onto the host bus when a processor cache read miss occurs, i.e., when the processor requests data that does not reside in the cache memory. If the data does not reside in main memory located on the host bus, but rather resides in memory located on the expansion bus, then the cache controller must generate cycles that propagate to the expansion bus to obtain the data. A problem arises because, while the cache controller is waiting for the data to be returned, it is generally not able to snoop other host bus cycles. Therefore, during this time while the cache controller is waiting for data to be returned from the expansion bus, no other processor or bus master can use the host bus because the cache controller would be unable to snoop these cycles. If host bus cycles were allowed to be performed, then cache coherency problems would result.

An example of a cache controller that is not able to snoop the host bus while it is waiting for the return of read data is the 82495 cache controller from Intel Corporation (Intel), also referred to as the C5 cache controller. For more information on the C5 cache controller, please refer to the Intel materials, which are hereby incorporated by reference. The C5 receives a bus grant signal referred to as CBGT_, which indicates that the C5 has control of the host bus. the present disclosure, a signal followed by "_" indicates that the signal is asserted when it has a logic low value. After the CBGT_ signal is asserted, the C5 can perform no other function, including snooping, until the current cycle it generated has completed. In the case of a read cycle to the expansion bus, this can be a long time, particularly if read cycles are posted to the expansion bus. This period of time is referred to as the non-snoop window, i.e., during this period or window of time, the cache controller is unable to snoop. Other bus masters cannot use the host bus during this time. Therefore, a method and apparatus is desired which reduces the non-snoop window of the C5 cache controller as well as other types of cache controllers to increase host bus utilization by other processors and bus masters, thus increasing system efficiency.

Background on local I/O cycles is deemed appropriate. The following disclosure is not considered to be prior art as to the present disclosure, but is included to more fully explain the background of the present invention. In order to increase system efficiency, a new multiprocessor computer system design includes placing various logic such as the direct memory access (DMA) logic, timers, and interrupt control logic, local to each respective CPU, rather than having it situated on the expansion bus as in prior art systems. Thus, in this design, the respective processor control ports and other support logic for each processor is located on the respective processor card or CPU board. In addition, each processor includes a local input/output (I/O) bus that is used to access this logic without having to access either the host bus or expansion bus. This reduces host bus traffic and increases system efficiency. For more information on the above system, please see U.S. patent application Ser. No. 07/955,683 entitled ARRANGEMENT OF DMA, INTERRUPT AND TIMER FUNCTIONS TO IMPLEMENT SYMMETRICAL PROCESSING IN A MULTIPROCESSOR COMPUTER SYSTEM, filed concurrently herewith, which is hereby incorporated by reference.

In the above design, the C5 cache controller discussed above is again unable to snoop host bus cycles while a cycle is pending on its local I/O bus. This problem is aggravated if cycles are posted to the local I/O bus. Therefore, a method and apparatus is desired which reduces the non-snoop window of a cache system to enable other devices to use the host bus during this time and increase host bus efficiency.

Background on write posting operations in computer systems is also deemed appropriate. An example of write posting occurs when an initiating device such as a microprocessor or cache controller performs a write operation to a destination device where the write cycle passes through an intermediary device, such as a bus controller or buffer. The processor executes the write cycle to the intermediary device with the expectation that the intermediary device will initiate a cycle or transfer to complete the write operation to the destination device being accessed. If the intermediary device includes write posting capability, the intermediary device will latch the address and data of the write cycle and immediately return a ready signal to the initiating device indicating that the operation has completed. This allows the initiating device to perform useful work during the time required for the write operation to actually complete.

SUMMARY OF THE INVENTION

The present invention comprises a method and apparatus which reduces the non-snoop window of a cache controller during certain operations to increase host bus efficiency. Cache interface logic according to the present invention monitors the cache controller for read cycles that require the expansion bus and read or write cycles destined for the local I/O bus. When such a cycle is detected, the cache interface logic begins the cycle and does not assert the bus grant signal to the cache controller. The cache controller thus believes that the cycle has not yet begun and is thus able to perform certain other operations, including snooping other host bus cycles. During this time, the respective cycle executes. When the cycle completes, for example, when the read data is returned from either the expansion bus or local I/O bus, or when a local I/O write completes, the control logic provides the bus grant cycle to the cache controller at an appropriate time. When the cache controller receives the bus grant signal, the requested data has already arrived in a read cycle, or the respective local I/O write has already completed, and thus the non-snoop window is reduced.

BRIEF DESCRIPTION OF THE DRAWINGS

A better understanding of the present invention can be obtained when the following detailed description of the preferred embodiment is considered in conjunction with the following drawings, in which:

FIG. 4 is a state transition diagram illustrating operation of the EISA_RD logic of FIG. 3;

DETAILED DESCRIPTION OF THE PREFERRED EMBODIMENT

Figure 1:
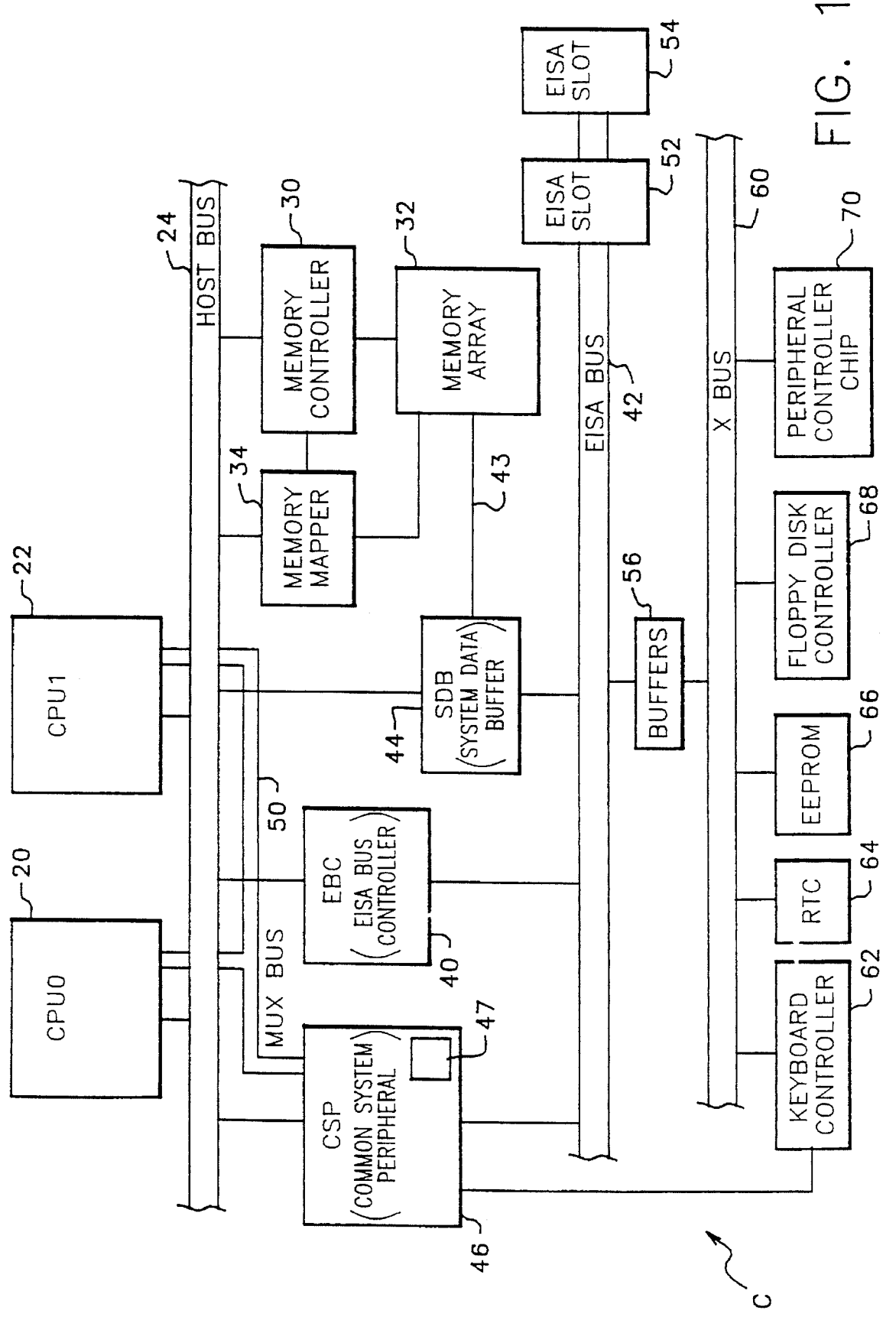
FIG. 1 is a block diagram of a computer system incorporating the present invention.

Referring now to FIG. 1, a computer system C is shown. The computer system C is a multiprocessor system in the preferred embodiment although the present invention may be incorporated into a single processor system. The computer system elements that are not discussed in detail below are not significant to the present invention other than to illustrate an example of a fully configured computer system. In the description that follows, signal names followed by "_" are asserted when they have a logic low value. Signal names preceded by a "/" are the inverse of the signal without the "/."

The computer system C includes two CPU boards referred to as CPU0 and CPU1 connected to a host bus 24. A memory controller 30 is coupled to the host bus 24. A main memory array 32, preferably comprised of dynamic random access memory (DRAM) is coupled to the memory controller 30. Memory mapper logic 34 is coupled to the host bus 24, the memory controller 30 and the memory array 32. The memory mapper logic 34 provides memory mapping functions to facilitate memory accesses to the memory array 32.

A bus controller 40, preferably the EISA bus controller (EBC), is coupled between the host bus 24 and an expansion bus 42, preferably the Extended Industry Standard Architecture (EISA) bus. The EBC 40 provides various bus cycle translation and conversion functions to facilitate transfers between the host bus 24, the EISA bus 42, and a memory bus 43. The EBC 40 includes a 64 bit buffer for gathering read data from a device on the EISA bus 42 that has been requested by a device on the host bus 24. A system data buffer (SDB) 44 is also coupled between the host bus 24, the EISA bus 42, and the memory array 32 to allow data flow between the three elements. The SDB 44 is coupled to the memory array 32 by the memory bus 43. A logic block referred to as the common system peripheral (CSP) 46 is coupled between the host bus 24 and the EISA bus 42. The CSP 46 is also coupled through a MUX bus 50 to a logic block referred to as the distributed system peripheral (DSP) (FIG. 2) in each of CPU0 and CPU1. The CSP 46 is also coupled to a keyboard controller 62.

The CSP 46 includes various system functions including a direct memory access (DMA) controller, EISA arbitration controller, and numerous system board logic functions such as memory refresh control, among others (all not shown). The CSP 46 also includes interrupt receive logic which receives the various interrupt signals from the various peripheral and I/O devices and transmits these interrupt request signals to the DSP logic in each of CPU0 and CPU1 via the MUX bus 50. The DSP (FIG. 2) includes an interrupt controller, timers, CPU ports, portions of the DMA system and other processor related items. For more information on the operation of the MUX bus 50, please see related copending application Ser. No. 07/955,482, titled MULTIPLEXED COMMUNICATION PROTOCOL BETWEEN CENTRAL AND DISTRIBUTED PERIPHERALS IN MULTIPROCESSOR COMPUTER SYSTEMS, filed concurrently with this application, which is hereby incorporated by reference.

The EISA bus 42 includes a plurality of EISA slots 52 and 54 for receiving EISA bus master expansion cards, for example, a network interface card or a hard disk interface card. The EISA bus 42 is coupled through buffers 56 to a bus referred to as the X bus 60. A number of peripheral devices are coupled to the X bus 60 including the keyboard controller 62, a real time clock (RTC) 64, EEPROM (electrically erasable programmable read only memory) 66, a floppy disk controller 68, and a peripheral controller chip 70 which includes numerous ports and UARTS (universal asynchronous receiver/transmitters).

Figure 2:
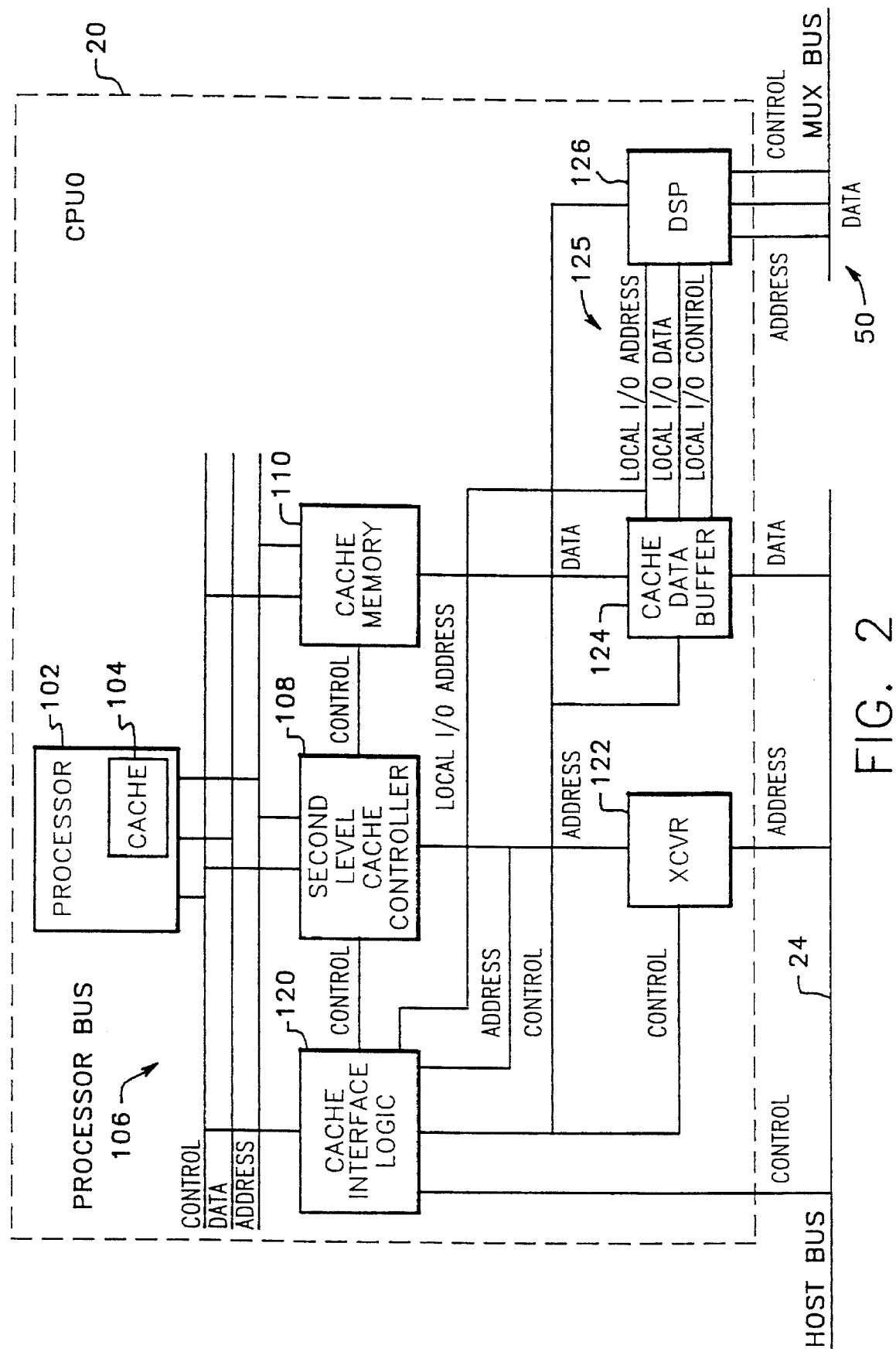
FIG. 2 illustrates a CPU board of FIG. 1.

Referring now to FIG. 2, a block diagram of CPU0 is shown. CPU0 and CPU1 operate in an identical manner, the only difference being that only CPU0 generates a memory refresh in the preferred embodiment. In the following description CPU0 is described for simplicity, and the following description applies equally well to CPU1. CPU0 includes a processor 102 which preferably includes an internal cache 104. The processor 102 is preferably the Intel i486 processor. However, the use of other types of processors is also contemplated. The processor 102 is coupled to a processor bus 106 including control, data and address portions, as shown.

A second level cache controller 108 is coupled to the control and address portions of the processor bus 106. Cache memory 110 is coupled to the data and address portions of the processor bus 106. The second level cache controller 108 connects to the cache memory 110 via various control lines as shown. The second level cache controller 108 is preferably the C5 or 82495 cache controller produced by Intel. The cache memory 110 preferably comprises the C8 or 82490 RAMs produced by Intel which are normally used with the C5 cache controller. The C5 is a second level cache controller for the i486 processor that works in conjunction with the C8 RAMs to provide a unified write-back data and instruction cache which is transparent to system software. The cache memory 110 is preferably organized with a 256 bit line size. Although this configuration is used in the preferred embodiment, other configurations may of course also be used.

Cache interface logic 120 is coupled to the second level cache controller 108 through control lines and is coupled to the control portion of the processor bus 106, as shown. The address pins of the second level cache controller 108 are connected to a transceiver 122 which in turn is connected to the Lost bus 24. The address pins of the second level cache controller 108 are also connected to the cache interface logic 120. The address lines coupled between the second level cache controller 108 and the transceiver 122 are bi-directional, meaning that the second level cache controller 108 can drive an address through the transceiver 122 onto the host bus 24 and can also receive an address from the host bus 24 through the transceiver 122. The data pins of the cache memory 110 are connected to a cache data buffer 124 which in turn is connected to the host bus 24. The cache data buffer 124 is connected to the DSP 126 via a local I/O bus 125 comprising local I/O address, data and control lines, as shown. The cache interface logic 120 provides a portion of the local I/O address to the local I/O address lines coupled between the cache data buffer 124 and the DSP 126. The cache memory 110 also provides control lines to the DSP 126. The DSP 126 is connected through the MUX bus 50 to the CSP 46 (FIG. 1).

The cache interface logic 120 is connected to the host bus 24 via control lines and also is connected to the address transceiver 122, the cache data buffer 124 and the DSP 126 via control lines. The control lines from the cache interface logic 120 to the address transceiver 122 and the cache data buffer 124 act as output enables for both the second level cache controller 108 and the cache memory 110.

The cache interface logic 120 provides the required bus controller functions to interface the second level cache system comprising the second level cache controller 108 and cache memory 110 with the host bus 24. The cache interface logic 120 provides necessary signal interpretation and translation functions between the second level cache controller 108 and the host bus 24.

Figure 3:
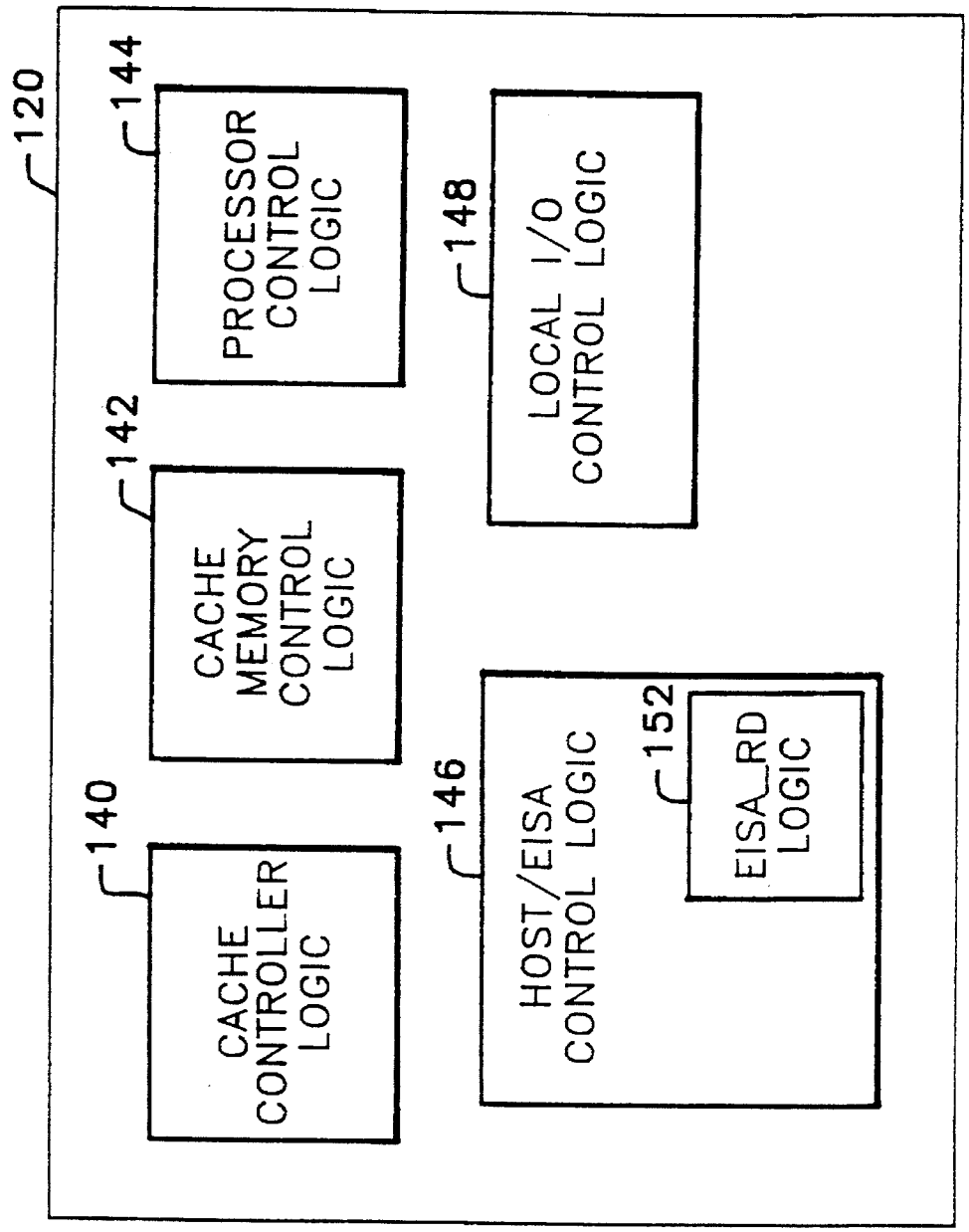
FIG. 3 is a more detailed block diagram of the cache interface logic of FIG. 2.

Referring now to FIG. 3, the cache interface logic 120 includes cache controller logic 140 which controls operation of the cache controller 108, cache memory control logic 142 which controls operation of the cache memory 110 and the cache data buffer 124, processor control logic 144 which controls operation of the processor 102, host/EISA control logic 146 which controls host bus and EISA bus operations, and local I/O control logic 148 which controls operation of the local I/O bus 125. The host/EISA control logic 146 includes EISA_RD logic 152 according to the present invention which reduces the non-snoop window of the cache controller 108 during reads to the EISA bus 42. The local I/O control logic 148 reduces the non-snoop window during local I/O cycles according to the present invention. The EISA_RD logic 152 and local I/O logic 148 are discussed further below.

As discussed in the background, when a cache read or write miss occurs, then read or write cycles respectively, must be generated onto either the host bus 24 or local I/O bus 125 to obtain the requested data or perform the write operation. If the data resides on the expansion bus 42, in the case of a read, or in the case of a write if the destination of the write data is to the expansion bus 42 then the cycles must propagate to the expansion bus 42. A problem arises because, while the second level cache controller 108 is waiting for the data to be returned or the write cycle to be performed, it is not able to snoop other host bus cycles. Therefore, during this time while the cache controller 108 is waiting for a cycle to complete on either the expansion bus 42 or local I/O bus 125, no other processor or bus master can use the host bus 24 because the cache controller 108 would be unable to snoop these cycles. If host bus cycles were allowed to be performed, then cache coherency problems could result.

As mentioned above, the second level cache controller 108 of the preferred embodiment is the C5 from Intel, which is not able to snoop the host bus 24 after it has received its bus grant signal CBGT_ until the respective cycle completes. As described in the background, the CBGT_ signal indicates that the cache controller 108 has control of the host bus 24. After the CBGT_ signal is asserted, the cache controller 108 can perform no other function, including snooping, until the current cycle it generated has completed. In the case of a read cycle to the expansion bus 42, this can be a long time, particularly if read cycles are "posted" to the expansion bus 42. Local bus write cycles that are posted, as well as local I/O bus read cycles and non-postable write cycles, may also take a long time. The period of time during which the cache controller 108 is prevented from snooping is referred to as the non-snoop window, i.e., during this period or window of time, the cache controller 108 is unable to snoop. Other processors or bus masters cannot use the host bus 24 during this time for cache coherency reasons.

The present invention comprises a method and apparatus which reduces the non-snoop window of the cache controller 108 during expansion bus cycles and local bus cycles to enable other devices to use the host bus 24 for a greater period of time. The operation of the computer system of the preferred embodiment using this feature is as follows.

When a processor I/O access occurs, the second level cache controller 108 broadcasts the requested address to the cache interface logic 120 and also provides the address to the address transceiver 122. If a write is involved, then the write data is stored in the cache data buffer 124. The cache interface logic 120 performs an address decode to determine if the requested I/O address requires a host bus/EISA bus cycle or requires access to ports in the DSP 126.

If the I/O address is directed to a port in the DSP 126, then the cache interface logic 120 provides a portion of the local I/O address to the DSP 126. The cache data buffer 124 provides the lower two bits of the local I/O address, these being byte enable signals. The cache interface logic 120 includes the capability of posting certain write cycles to the DSP 126. On a postable write cycle to the local I/O bus 125, once the cache interface logic 120 receives the destination address and the cache data buffer 124 receives the write data, the cache controller 108 is able to perform other operations. On postable write cycles, the local I/O logic 148 in the cache interface logic 120 delays assertion of the CBGT_ signal to the cache controller 108 until the cycle is actually posted so that the end of the cycle is the next PCLK signal cycle after the CBGT_ signal is asserted. Thus the non-snoop window is reduced.

Read cycles and certain types of local I/O write cycles cannot be posted. During non-postable write cycles, the local I/O logic 148 delays assertion of the CBGT_ signal to the cache controller 108 until after the write data has been transferred to the DSP 126. During local I/O read cycles, the CBGT_ signal is only asserted after the read data has been returned from the DSP 126 to the cache data buffer 124 and the cache memory data path is available. Thus here the non-snoop window is greatly reduced.

If the cycle address requires a host bus cycle, the cache interface logic 120 enables the address transceiver 122 to present the address onto the host bus 24. In the case of a memory read, the memory mapper logic 34 determines whether the requested data resides in the memory array 32 on the host bus 24 or resides in memory situated on the EISA bus 42. In the case of a memory write, the memory mapper logic 34 determines whether the destination of the write data is the memory array 32 or memory situated on the EISA bus 42. If the cycle requires use of the memory array 32, then the cache interface logic 120 initiates host bus cycles to perform the transfer. Here the host bus cycle is performed so quickly that the non-snoop window does not need to be reduced. In addition, since the host bus 24 is being used, no other devices can use the host bus 24 anyway and thus the cache controller's inability to snoop does not matter.

If the cycle involves memory situated on the expansion bus 42, or if the access is an I/O access that does not involve the DSP 126, then the cache interface logic 120 generates a host bus cycle to the EBC 40 which in turn generates cycles on the EISA bus 42 to perform the transfer. In the case of write cycles, the EBC 40 includes posting capability whereby write cycles to the EISA bus 40 are posted. Once the EBC 40 receives the destination address and write data, the EBC 40 returns a ready signal to the respective CPU, thus allowing other operations to continue. In the preferred embodiment, the non-snoop window reduction methods of the present invention are not used for expansion bus write cycles since the cycles occur so quickly.

On read operations to memory situated on the EISA bus 42, a type of "posting" referred to as split transactions is performed. In these operations the read operation is issued to the EISA bus 42, but the host bus 24 is released so other operations can continue. The EBC 40 gathers data in up to 64 bit chunks and provides this data to the host bus 24. When a respective chunk of data has been gathered by the EBC 40, it is provided over the data lines in the host bus 24 during an idle period, providing the data back to the CPU which requested the read, so that its operations can continue. For more information on split transactions operations, please see application Ser. No. 07/955,930, entitled SPLIT TRANSACTIONS AND PIPELINED ARBITRATION OF MICROPROCESSORS IN MULTIPROCESSING COMPUTER SYSTEMS, which is hereby incorporated by reference.

The EISA_RD logic 152 of the present invention monitors cache controller read cycles to the expansion bus 42 and controls the assertion of the CBGT_ signal to the cache controller 108. When such a cycle is detected, the EISA_RD logic 152 directs the cache interface logic 120 to begin the cycle but not assert the CBGT_ signal to the cache controller 108. The cache controller 108 thus believes that the cycle has not yet begun and is thus able to perform other operations, such as snooping other host bus cycles. During this time, the read cycle executes and the requested data is gathered by the EBC 40. Meanwhile, the processors and bus masters can use the host bus 24. When the read data is returned and presented onto the host bus 24, the EISA_RD logic 152 asserts the CBGT_ signal to the cache controller 108 at an appropriate time. When the cache controller 108 receives the CBGT_ signal, the data has already arrived. The cache controller 108 can thus immediately latch in the read data and complete the cycle and thus the non-snoop window is reduced.

EISA_RD state machine

Referring now to FIG. 4, a state transition diagram illustrating operation of the EISA_RD logic 152 is shown. Prior to discussing the state machine, a brief review of the signal names used in the state machine is deemed appropriate.

A signal referred to as HCLK is a host bus clocking signal having a frequency of 25 or 33 MHz.

A signal referred to as PCLK is a processor clocking signal having a frequency twice that of the HCLK signal.

A signal referred to as PHASE is logic high on the positive or rising edge of the HCLK signal and is a low on the falling edge of the HCLK signal.

A signal referred to as HLOCAL_ is asserted to indicate that requested data or the destination of write data resides on the host bus 24 and is negated to indicate that a cycle requires memory on the expansion bus 42.

A signal referred to as HBLAST_ is asserted to indicate the last cycle of a burst transfer.

A host burst ready signal referred to a HBRDY_ indicates to a host bus master that a data transfer is complete. The asserted HBRDY_ signal at the end of a data transfer causes the respective master and slave to burst to the next transfer unless the cycle is the last burst cycle, signified by the HBLAST_ signal being asserted, or the cycle has been terminated. If the HBRDY_ signal is asserted and the requested data resides on the expansion bus 42, signified by the HLOCAL_ signal being inactive, then the read or write is presumed to have been posted to the expansion bus 42, and no bursting occurs.

A signal referred to as HDREQ_ is used during expansion bus "posted" reads. If the EBC 40 has an available or open read buffer, it returns the HBRDY_ signal and the HBLAST_ signal to indicate that it has received the EISA read request. When the EBC 40 has obtained the data from the EISA bus 42, it asserts the HDREQ_ signal and waits for a valid time to deassert the signal. When the HDREQ_ signal is sampled inactive after being active, then requested read data is valid on the host data bus 24.

A signal referred to as SNOOP_HIT indicates that a snoop hit has occurred in the cache controller 108.

Signals referred to as TONE and TTWO indicate how much data are being returned from the EISA bus 42 on an EISA read cycle. The TONE signal indicates that 64 bits are being returned and the TTWO signal indicates that 128 bits are being returned. When an EISA read cycle has been posted and the data to be returned is cacheable data, then generally the cache interface logic 120 and cache data buffer 124 gather a sufficient amount of data, i.e. 256 bits, to perform a line fill in the cache memory 110. However, if a processor write to the EISA bus 42 occurs before all of this data has been gathered to the EBC 40, then cache coherency concerns are presented. In this situation, a signal referred to as ABORT_FLAG is asserted, and the cache interface logic 120 and cache data buffer 124 only gather sufficient data to minimally satisfy the processor read request and do not gather enough data to perform a full cache memory line fill. The cache interface logic 120 also designates this data as non-cacheable to prevent this data from being cached. The TONE and TTWO signals are used to indicate which minimum amount of data, either 64 bits or 128 bits respectively, are being supplied back to the processor 102 to satisfy the processor read request in these situations.

A two bit signal referred to as LINE_CNT indicates how many 64 bit blocks of data have been returned from the EISA bus during an EISA read line-fill cycle. The two bits comprising LINE_CNT have a 0 value if 64 bits are being returned, a value of 1 for 128 bits, a value of 2 for 192 bits, and a value of 3 for 256 bits.

A signal referred to as SNPING indicates that the cache controller 108 is performing either a snoop look-up cycle or snoop write-back cycle.

A signal referred to as CSNPBSY_ signal is asserted to indicate that the cache controller 108 is doing a back invalidation to the respective CPU in the instance where it cannot snoop the host bus 24.

A signal referred to as CDTS_ is asserted during a read to indicate that on the next PCLK signal cycle the CPU data bus path is available and is asserted during a write cycle to indicate that the write data is available to be supplied to the destination memory.

A signal referred to as CLEN0 indicates that the current CPU bus cycle comprises one or two transfers.

A signal referred to as CLEN1 indicates that the length of the CPU bus cycle is four transfers.

A signal referred to as EISA_FLAG indicates that the cache controller 108 has generated a cycle that is destined for the EISA bus 42.

The following equations are used to simplify FIG. 4:
EQN_1=(HDREQ_•TONE•/(SNPING+/CSNPBSY_)•CDTS)
EQN_2=(HDREQ_•(TTWO+ABORT_FLAG)•(LINE_CNT=1) •/(SNPING+/CSNPBSY_)•CDTS_)
EQN_3=(HDREQ_•(LINE_CNT=3)•/(SNPING+/CSNPBSY_)•/CDTS)
EQN_4=(HDREQ_•SNPING•/SNOOP_HIT)
EQN_5=(HDREQ_•SNPING•SNOOP_HIT)
EQN_6=(PHASE•/(SNPING+/CSNPBSY_)•/CDTS_)
EQN_7=((TTWO+ABORT_FLAG)•(LINE_CNT=1))
EQN_8=(LINE_CNT=3)
EQN_9=EQN_6•(TONE+EQN_7+EQN_8)
EQN_10=EQN_6•/(TONE+EQN_7+EQN_8)
EQN_11=(PHASE•/SNOOP_HIT•/CDTS_)
EQN_12=EQN_11•(TONE+EQN_7+EQN_8)
EQN_13=EQN_11•/(TONE+EQN_7+EQN_8)
EQN_14=(TONE+(ABORT_FLAG•/CLEN1))
EQN_15=(TTWO+(ABORT_FLAG•/CLEN1))

The state machine includes ten states referred to as E0–E9. The state machine begins in state E0, and all states lead to this state upon an asserted reset signal. The state machine transitions on the rising edge of the PCLK signal. The state machine remains in state E0 while the $EISA_{13}$ FLAG signal is negated, i.e., while no processor initiated cycles are destined for the EISA bus 42. The state machine transitions from state E0 to state E1 when the $EISA_{13}$ FLAG signal is asserted indicating that a cycle has been generated which is destined for the EISA bus 42. The state machine remains in state E1 while the $HBRDY_{13}$ signal is negated high. The state machine transfers from state E1 to state E7 when the $HBRDY_{13}$ signal is asserted on the rising edge of the HCLK signal cycle, signified by the equation:

PHASE•/$HBRDY_{13}$.

The HBRDY_ signal is asserted by the EBC 40 to indicate that it has received the EISA read request.

In state E7, the EBC 40 is performing EISA read cycles, gathering up to 64 bits of the requested read data to be provided back to the requesting cache controller 108. During state E7, the requesting cache controller 108 is snooping the host bus 24 while other processors and bus masters perform host bus cycles. Host bus activity during this time is made possible by the non-snoop window reduction features of the present invention. If the requesting cache controller 108 detects a snoop hit to a dirty line, then the cache controller 108 will perform a write-back cycle to provide the correct copy of data to the requesting device.

The state machine transitions from state E7 to E2 when the $HDREQ_{13}$ signal is asserted on the rising edge of the HCLK signal, indicating that the EBC 40 has received up to 64 bits of the requested data from the EISA bus 40.

The state machine returns from state E2 to state E0 when the $HDREQ_{13}$ signal is deasserted, indicating that data presentation on the host data bus 24 has completed, the cache controller 108 is not snooping any cycles on the host bus 24, indicated by the SNPING signal being negated, and more data must be gathered from the EISA bus 42 to satisfy the read request. Upon returning to state E0, the state machine again returns to state E7 to gather another chunk of up to 64 bits of data and then present this data onto the host bus 24 in state E2. For cache memory line fills, which require 256 bits of data, this sequence occurs four times and requires four host bus cycles.

The state machine advances from state E2 to state E8 if the $HDREQ_{13}$ signal is deactivated, indicating that the data has been presented on the host bus 24 and, in addition, the cache controller 108 is snooping the host bus 24 but a snoop hit has not yet been determined. This is signified by the equation:

(HDREQ_•SNPING•/SNOOP_HIT)

The state machine advances from state E2 to state E9 when the HDREQ_ signal is deasserted, the cache controller 108 is snooping, and a snoop hit has been determined. This is signified by the equation:

(HDREQ_•SNPING•SNOOP_HIT)

The state machine advances from state E8 to state E9 when a snoop hit is determined in state E8.

The state machine returns from state E8 to state E0 after the snoop cycle completes if the cache interface logic 120 needs to retrieve more data using EISA bus cycles. If the cache interface logic 120 was performing a line fill and a processor 102 has also just performed a write to a memory location, resulting in abortion of the EISA line fill, then the state machine returns from state E8 to E0 if more read data is required to minimally satisfy the read request. This is signified by EQN_10. The state machine returns from state E9 to state E0 when the snoop write-back cycle has completed, the cache controller 108 has reissued the CADS_ signal, and the cache interface logic 120 needs to retrieve more data using EISA bus cycles.

The state machine transfers from state E9 to state E3 when EQN_12 is true, i.e., the SNOOP_HIT signal has been deasserted, the processor data bus is available, and the cache interface logic 120 and cache data buffer 124 have obtained the required data from the EISA bus 42 that is to be transferred to the processor 102. It is also noted that the state machine transfers from state E8 to state E3 if these conditions are true in state E8, signified by EQN_9 being true.

Thus, the state machine returns from either states E8 and E9 to E0 if the cache interface logic 120 and cache data buffer 124 need to gather additional data. States E8 and E9 are involved with the situation where there has been a host bus snoop cycle while EISA read data was being presented on the host bus 24. The state machine advances from either state E8 or state E9 to state E3 when the snoop cycle completes, the EISA read cycle is reissued by the cache controller 108 and the EBC 40 has gathered all of the data that is to be transferred to the requesting processor 102.

In the situation where there has not been an intervening write operation on the host bus 24 while the EISA bus operations are being performed, the state machine simply transfers from state E2 to state E3. The state machine also transitions from state E2 to E3 if an intervening EISA write occurred, resulting in abortion of the cache memory line fill, and the cache data buffer 124 has the correct amount of data. The transition from state E2 to E3 is signified by any of EQN_1, EQN_2 or EQN_3 being true.

In summary, the state machine eventually reaches state E3 when the host bus 24 is clear of any cycles, the cache controller data path is clear, and the cache data buffer 124 has the correct amount of data that is to be transferred to the requesting processor 102.

The state machine transfers from state E3 to state E5 if only one 64 bit transfer is to be performed on the host bus, signified by EQN_14 being true. When the transfer completes in state E5, the state machine returns to state E0 when the PHASE signal is asserted. The state machine advances from state E3 to state E4 if either two or four 64 bit transfers are required to return the EISA read data to the requesting cache controller 108 on the host bus 24. The state machine remains in state E4 while the LINE_CNT bits are not equal to 0. When either two or four host bus transfers have completed and the $LINE_{13}$ CNT bits have been decremented to 0 in state E4, then the state machine advances to state E6 and then returns to state E0 on the rising edge of the HCLK signal cycle.

The CBGT_ signal is asserted in either of states E4 or E5. In this manner, the $CBGT_{13}$ signal is asserted to the cache controller 108 only after all of the requested data has been obtained through the required number of EISA bus cycles and gathered into the cache data buffer 124 to be returned to the cache controller 108. This reduces the non-snoop lockout window, allowing the cache controller 108 to snoop other host bus cycles during prior states as necessary while the data is being gathered from the EISA bus 42. This allows other host bus processors or bus masters to perform cycles on the host bus 24 while an EISA read cycle is pending by a respective CPU, thus increasing system efficiency.

EISA_RD timing diagram

Figure 5A:
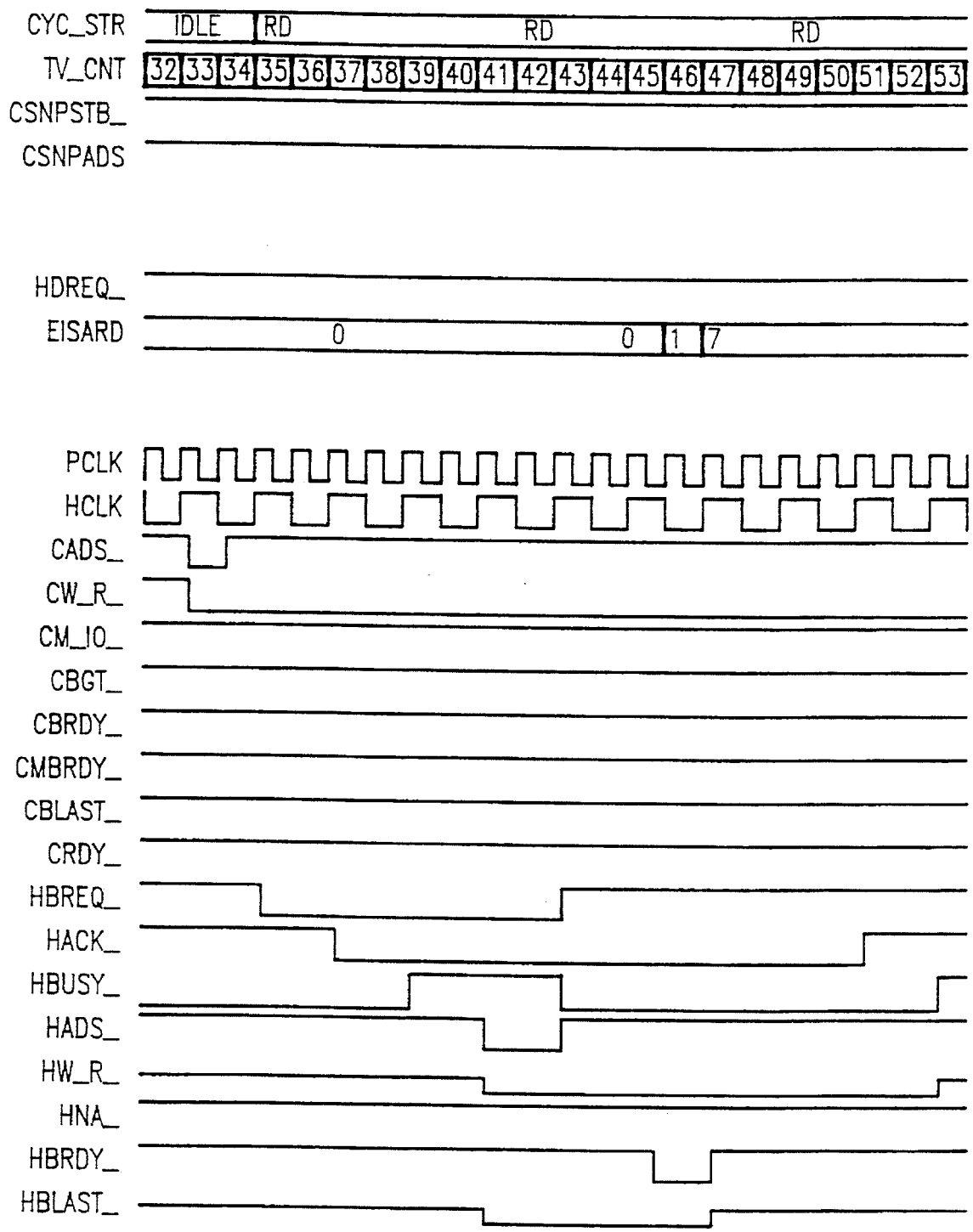
FIGS. 5A, 5B, and 5C are a timing diagram illustrating operation of the EISA_RD logic of FIG. 4.
Figure 5B:
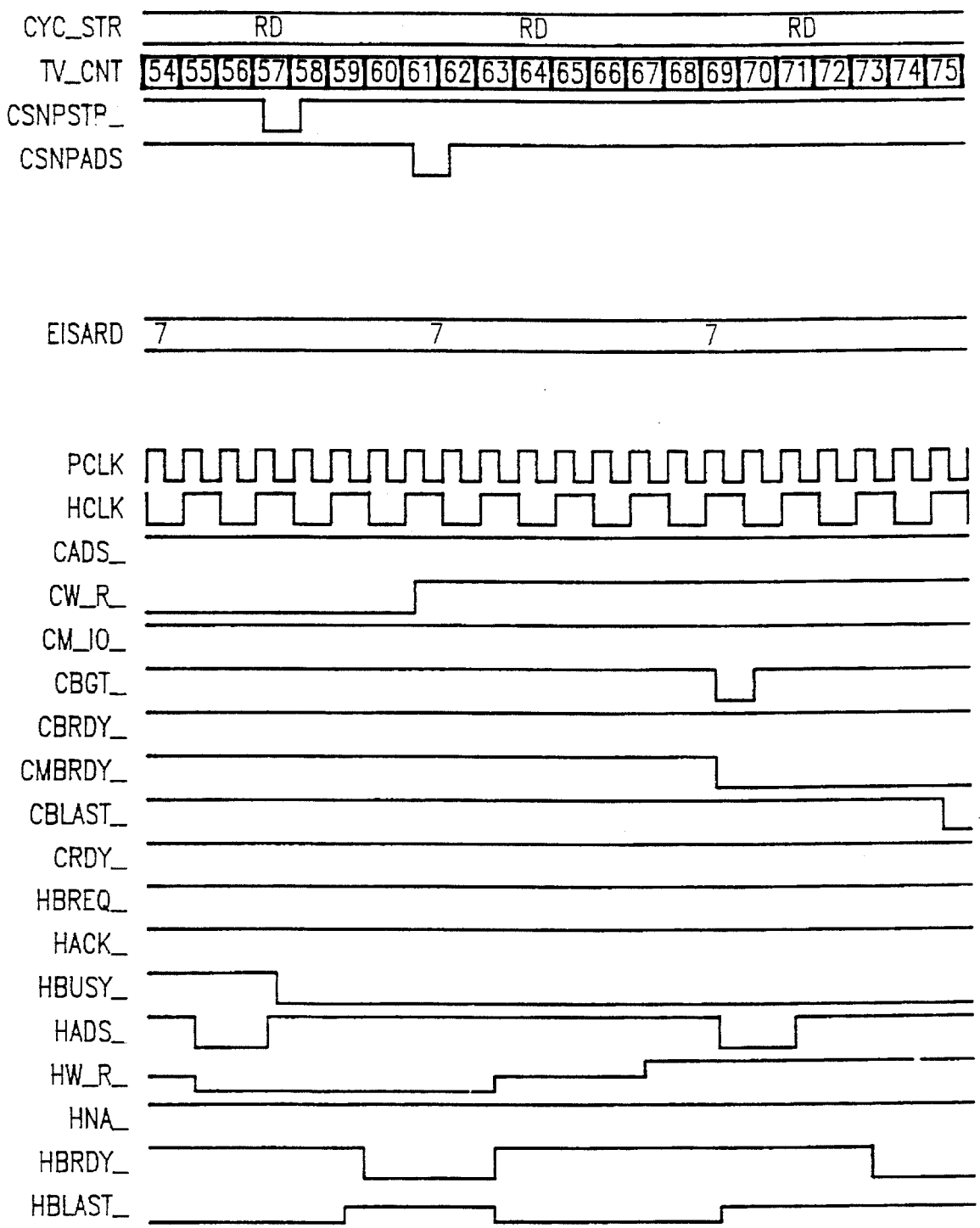
Figure 5C:
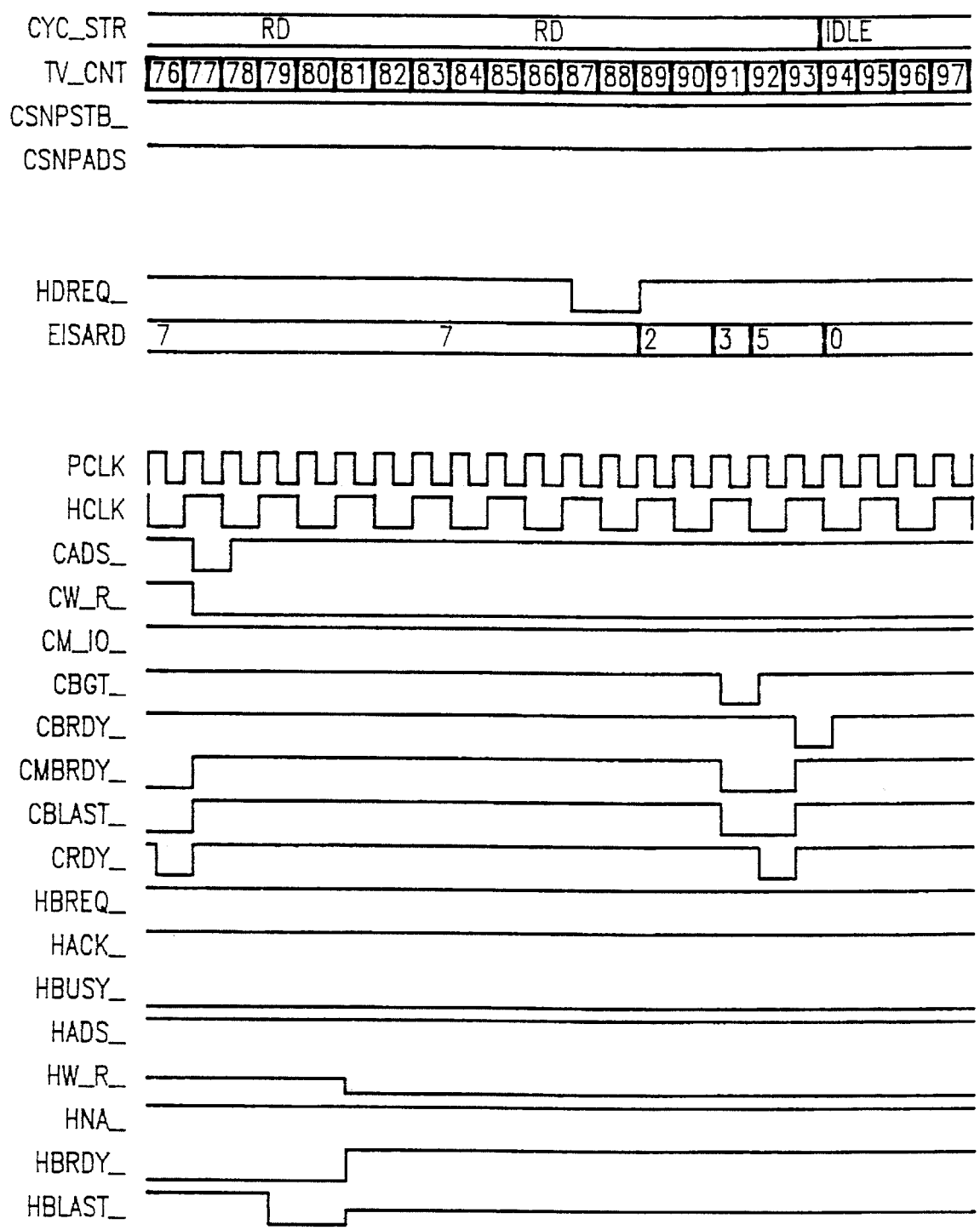

Referring now to FIGS. 5A, 5B, and 5C, a timing diagram illustrating an EISA read cycle which includes a snoop write-back cycle as well as the non-snoop window reduction features of the present invention is disclosed. The following timing diagrams illustrate the process whereby the cache interface logic 120 reduces the window during which the cache controller 108 cannot snoop. This window reduction occurs for both local I/O reads and writes, and EISA posted read operations. The non-snoop window reduction is most dramatically shown for EISA posted read operations because of the large number of cycles that an EISA read operation requires.

A brief review of the row designations and signals illustrated in the timing diagram of FIGS. 5A, 5B, and 5C is deemed appropriate. Descriptions of signals previously introduced are repeated here for convenience.

At the top of the respective timing diagrams, the row indicated by "CYC_STR" indicates the type of cycle that is occurring on the host bus 24 at the respective time, either "IDLE," "RD" (read cycle), or "WR" (write cycle).

The row indicated by "TV_CNT" provides cycle numbers to properly identify points in the timing diagrams.

A signal referred to as CSNPSTB_ is asserted by the cache interface logic 120 to the cache controller 108 to start a snoop cycle. A host bus cycle initiated by another bus master indicates that the host bus 24 should be snooped and, in response, the cache interface logic 120 asserts the CSNPSTB_ signal to the cache controller 108.

A signal referred to as CSNPADS_ indicates the start of a line write-back cycle that occurs after a snoop hit to a dirty line in the cache memory 110.

As previously discussed, the HDREQ_ signal is asserted and then deasserted to indicate that data is valid on the host data bus 24.

The row indicated by "EISA_RD" indicates the respective states of the EISA_RD state machine.

The PCLK signal is a processor clocking signal preferably having a frequency of 50 MHz.

The HCLK signal is a host bus clocking signal having a frequency half that of the PCLK signal, 25 MHz in the preferred embodiment.

A signal referred to as CADS_ is a cache address strobe signal asserted by the cache interface logic 120 to begin all cache controller external cycles. The CADS_ cycle is active for one PCLK signal cycle.

A signal referred to as CW_R_ is asserted by the cache controller 108 and indicates whether a write or read cycle is occurring. The CW_R_ signal is high for write cycles and low for read cycles.

A signal referred to as CM_IO_ is asserted by the cache controller 108 and is a logic high value to indicate a memory cycle and a logic low value to indicate an I/O cycle. The CM_IO_ signal is low for both EISA I/O cycles and local I/O cycles.

The CBGT_ signal is the cache controller bus guarantee or bus grant transfer signal and is a commitment on the part of the cache interface logic 120 to complete a transfer. The cache controller 108 is unable to snoop the host bus 24 after the CBGT_ signal is asserted until the respective cycle completes.

A signal referred to as CMBRDY_ is asserted to clock data into or out of the cache memory 110.

A signal referred to as CBLAST_ is asserted with the final CMBRDY_ signal to indicate that this is the last Qword to be clocked into the cache data buffer 124, either during the start of a host bus write cycle or towards the end of a host bus read cycle.

A signal referred to as CBRDY_ is used to clock data into the CPU.

A signal referred to as HBREQ_ is asserted by the cache interface logic 120 to request access to the host bus 24. This signal is typically asserted in response to issuance of the CADS_ signal by the cache controller 108.

A signal referred to as HACK_ is a host bus acknowledge signal issued by host bus arbiter logic in the memory controller 30. This signal indicates that the current request is scheduled to get the host bus 24 when the HBUSY_ signal is sampled high.

A signal referred to as HBUSY_ is used to finalize arbitration for the host bus 24. The HBUSY_ signal is also asserted by a new bus master on each HCLK signal cycle after gaining control of the host bus 24.

A signal referred to as HADS_ is a host bus address strobe signal indicating the start of a host bus address.

A signal referred to as HW_R is a signal indicating whether a write or read cycle is occurring on the host bus 24. The HW_R signal is high for write cycles and low for read cycles.

A signal referred to as HNA_ is an input to the cache interface logic 120 which indicates pipelining may occur for the host bus address and status signals. The HNA_ signal indicates that a new address may be generated by a new host bus master while a previous bus master is waiting for the end of its host bus read or write data transfer to complete.

A signal referred to as HBRDY_ is the host bus burst ready signal and is used to inform the host bus master that a data transfer is complete.

A signal referred to as HBLAST_ also indicates the last transfer of a burst sequence and is activated by the respective bus master.

After the cache interface logic 120 receives the CADS_ signal, it provides HBREQ_ to get the host bus 24 and waits for the memory mapper logic 34 to indicate whether the cycle is an EISA cycle or a host bus cycle. After the memory mapper logic 34 indicates whether the cycle requires only the host bus 24 or also requires the expansion bus 42, this value is provided to the cache interface logic 120.

In the preferred embodiment of the invention, the CBGT_ signal is not asserted until after the HLOCAL_ signal sampling point, i.e., until the memory mapper logic 34 indicates whether the request requires only a host bus cycle, meaning the requested data resides in the memory array 32, or the request requires an EISA cycle. If the HLOCAL_ signal is asserted low, then the cycle is a host bus cycle and the CBGT_ signal is asserted immediately by the cache interface logic 120 to the cache controller 108. If the cycle is not a host bus cycle, but rather is an EISA cycle, the assertion of the CBGT_ signal is delayed for EISA read cycles according to the present invention so that the cache controller 108 can continue to snoop during the EISA posted read cycle. As previously noted, EISA write cycles are always posted and occur as quickly as host bus cycles, and thus no non-snoop reduction is necessary.

At cycle 34, the sampling of the CADS_ signal low by the cache controller 108 causes it to request the host bus 24, signified by the HBREQ_ signal being low in cycle 36. The cache interface logic 120 begins the read cycle and must wait to get control of the host bus 24 before continuing on.

In cycles 34–40, in parallel, while the cache interface logic 120 is waiting to gain bus mastership, the host address buffers 122 are loaded with the pending cycle address, the lower 2 bits of which are generated by the cache controller 108 for support of cache line fills from the EISA bus 42.

In cycle 41, with the sampling of the HBUSY_ signal high and the HACK_ signal low, the cache interface logic 120 begins a bus cycle. The cache interface logic 120 generates the host address strobe signal HADS. The host address buffers 122 are enabled and the host bus status signals HW_R_, HM_10_, etc. are also generated.

In cycle 45, the sampling point of the memory mapper logic 34 occurs. The memory mapper logic 34 indicates this (not shown in the timing diagram) to be an access to nonlocal memory, i.e., to memory on the EISA bus 42. The EISA_FLAG signal is asserted to the EISA_RD state machine to indicate a successful posting. The EISA_RD state machine transitions from state E0 to state E1.

In cycle 47, the cache interface logic 120 samples the HBRDY_ and the HBLAST_ signals low, indicating that the host data bus cycle is finished. The EISA_RD state machine transitions from state 1 to state 7. Also, the return of requested data from the posted read cycle is possible any time in the future, (this would be signified by the HDREQ_ signal going low and high). After this time, another CPU can gain control of the host bus 24.

In cycle 53, the cache interface logic 120 samples the HACK_ signal high and thus can cause a bus rearbitration. The cache interface logic 120 immediately tri-states all host bus signals except for the HBUSY_ signal, which is driven high for 1 HCLK signal cycle and then tri-started.

In cycle 55 (FIG. 5B), with the HBUS_ and HACK_ signals high, the cache interface logic 120 predicts that a host bus cycle will soon need to be snooped.

The cache interface logic 120 tri-states the HBUSY_ signal at this time. The HBUSY_ signal stays high for one more HCLK signal cycle, as it was driven high and has a pull-up resistor on it and the next bus master will not drive this signal active until cycle 57.

In cycle 57, the cache interface logic 120 samples the HADS_ signal active, indicating a valid address is available, and asserts the CSNPSTB_ signal to the cache controller 108 to cause it to snoop the cycle.

In cycle 58, the cache interface logic 120 tracks the start of the snoop cycle and waits for a snoop response signal referred to as CSNPCYC_ from the cache controller 108.

In cycle 59, the cache interface logic 120 samples the CSNPCYC_ signal (not shown) active. In the next PCLK signal cycle, if a snoop hit occurs, the snoop look up status signal CMHITM_ will be valid.

In cycle 60, the CMHITM_ signal (not shown) is asserted by the cache controller 108, indicating a snoop hit.

In cycle 61, the cache interface logic 120 recognizes the CMHITM_ signal is active. This recognition is delayed because the logic 120 tracks the host bus 24, and thus it samples signals on HCLK signal cycle boundaries.

In cycles 62–63, the CSNPADS_ signal is asserted by the cache controller 108, indicating a snoop write-back cycle is starting. The cache interface logic 120 loads the host address buffers 122 with the snoop write-back address at this time.

In cycles 64–76 the write-back cycle occurs.

In cycle 77 (FIG. 5C), the cache interface logic 120 samples the CRDY_ signal low, indicating the end of the snoop write-back cycle from the cache controller 108 side. The EISA read cycle is reissued between cycles 77 and 81 due to the write back interruption.

In cycle 81, with the sampling of the HBRDY_ signal low and the HBLAST_ signal low, the host bus cycle which was the object of the write back completes.

In cycle 89, the EISA_RD state machine samples the HDREQ_ signal low, indicating data will be valid when the HDREQ_ signal goes high. The EISA_RD state machine then advances to state E2.

In cycle 91, the EISA_RD state machine samples the HDREQ_ signal high, thus indicating that the host bus 24 has valid data. The EISA_RD state machine then advances to state E3.

The EISA_RD state machine now tells the cache controller 108 it is beginning the cycle by asserting the CBGT_ signal low_. The cache controller 108 is unable to snoop from the CBGT_ signal being asserted low until the end of the cycle, signified by the CRDY_ signal being asserted. By not issuing the CBGT_ signal until cycle 91 (sampled in 92), the cache controller 108, except for the small window (cycles 92 and 93), was able to snoop the entire time. This allowed other host bus masters to be able to use the host bus 24 during this time, thus increasing system efficiency.

In cycle 92 the EISA_RD state machine issues the CRDY_ signal in the next PCLK signal cycle after the CBGT_ signal is asserted to minimize the cache controller 108 non-snoop window. The EISA_RD state machine also advances to state E5.

In cycle 93 the cache interface logic 120 samples the CRDY_ signal active, indicating this CPU request has finished.

In cycle 94, the EISARD state machine returns to its idle state, state E0.

Local I/O Cycles

A local I/O cycle is run on I/O accesses to addresses in the DSP 126. As described above, local I/O accesses do not propagate out to the host bus 24, but are handled by the cache interface logic 120, cache data buffer 124, and DSP 126 in order to minimize the impact to host bus bandwidth.

Local I/O accesses impact the host bus 24 in two ways. First, the cache controller 108 is unable to snoop host bus transfers while driving out an address, and it is necessary to drive the cache controller 108 address to decode it to determine if it is an access to a local I/O port. Second, the cache controller 108 is unable to snoop host bus cycles after the CBGT_ signal is asserted until the current cycle completes.

The cache controller 108 asserts a cache address strobe signal CADS_ to the cache interface logic 120 in order to request an access as a result of a transfer from the CPU. If the CM/IO_ signal indicates an I/O access and the cache interface logic 120 is not currently generating a snoop request, the cache interface logic 120 enables the address outputs of the cache controller 108. The cache interface logic 120 decodes the address coming out of the cache controller 108 to determine if the access is to a local I/O address. As long as the cache controller address is asserted, the cache controller 108 is unable to snoop host bus transfers. This non-snoop period cannot be reduced, but if a host bus cycle begins while the cache controller 108 is driving an address to the cache interface logic 120, the cache interface logic 120 delays completion of a host bus cycle for snooping purposes by asserting a signal referred to as HPAUSE_ onto the host bus 24, thus minimizing the possible cache coherency effects that local I/O transfers may have on the host bus 24. For more information on use of the HPAUSE signal to delay host bus cycles for snooping purposes, please see copending patent application Ser. No. 753,420 entitled "MULTIPROCESSOR CACHE SNOOP ACCESS PROTOCOL," filed Aug. 30, 1991, which is hereby incorporated by reference.

If the access is not a local I/O access, then the cache interface logic 120 arbitrates for the host bus 24 and proceeds as described above. As noted above, the EISA_RD logic 152 of the present invention operates to reduce the non-snoop window during read cycles to the expansion bus 42. Otherwise, the cache interface logic 120 indicates to the cache data buffer 124 that a local I/O cycle is in progress.

Once the cache interface logic 120 latches the address on a read cycle, and when the cache interface logic 120 latches the address and the cache data buffer 124 latches the data on a write cycle, the cache interface logic 120 enables the cache controller 108 to resume snooping. It is noted that this information is latched without indicating to the cache controller 108 that the cycle has started, which is done by CBGT_, and the cycle is actually started and run anyway.

During the local I/O transfer described, the cache controller 108 address and cache memory data are buffered from the host bus 24 by the cache interface logic 120 and the cache data buffer 124, respectively, as shown in FIG. 2. By allowing these accesses to be performed using a separate bus, the local I/O bus 125, host bus cycles by other devices should be allowed to continue. However, in order to maintain cache coherency these accesses must be snooped by the cache controller 108, and, as described above, once the cache controller 108 begins a cycle and receives the CBGT_ signal, the cache controller 108 is prevented from snooping host bus cycles.

One way to allow other bus masters to initiate host bus cycles during this time is for the cache interface logic 120 to delay host bus cycles that need to be snooped using the HPAUSE_ signal. The cache interface logic 120 would track the host address strobe signal HADS_ in order to generate snoop requests. If the cache interface logic 120 detected a host bus cycle after the CBGT_ signal had been asserted to the cache controller 108, the cache interface logic 108 would assert the HPAUSE_ signal to delay the continuation of the cycle until the cache controller 108 was able to snoop the address for the current host bus cycle.

This solution is undesirable because it would have an adverse impact on host bus bandwidth. Therefore, the apparatus of the present invention delays assertion of the CBGT_ signal to the cache controller 108 to reduce the non-snoop window and allow other bus masters to use the host bus 24. On posted local I/O write cycles, the cache interface logic 120 delays assertion of the CBGT_ signal until the posting operation is actually performed to a posting buffer. On non-posted writes, the cache interface logic delays assertion of the CBGT_ signal until after the local I/O write cycle actually completes.

On local I/O read cycles, the local I/O state machine logic 148 in the cache interface logic 120 reduces the impact to the host bus bandwidth by effectively "posting" local I/O reads from the cache controller 108 to the cache data buffer 124 and DSP 126 as seen from the cache controller 108. The cache interface logic 120 accomplishes this by delaying assertion of the CBGT_ signal to the cache controller 108 as it does during EISA posted reads until after the read data is returned from the DSP 126 to the cache data buffer 124. This allows the cache controller 108 to continue to snoop host bus transfers while the cache data buffer 124 and the DSP 126 carry out the local I/O read.

Local I/O State Machine

Figure 6A:
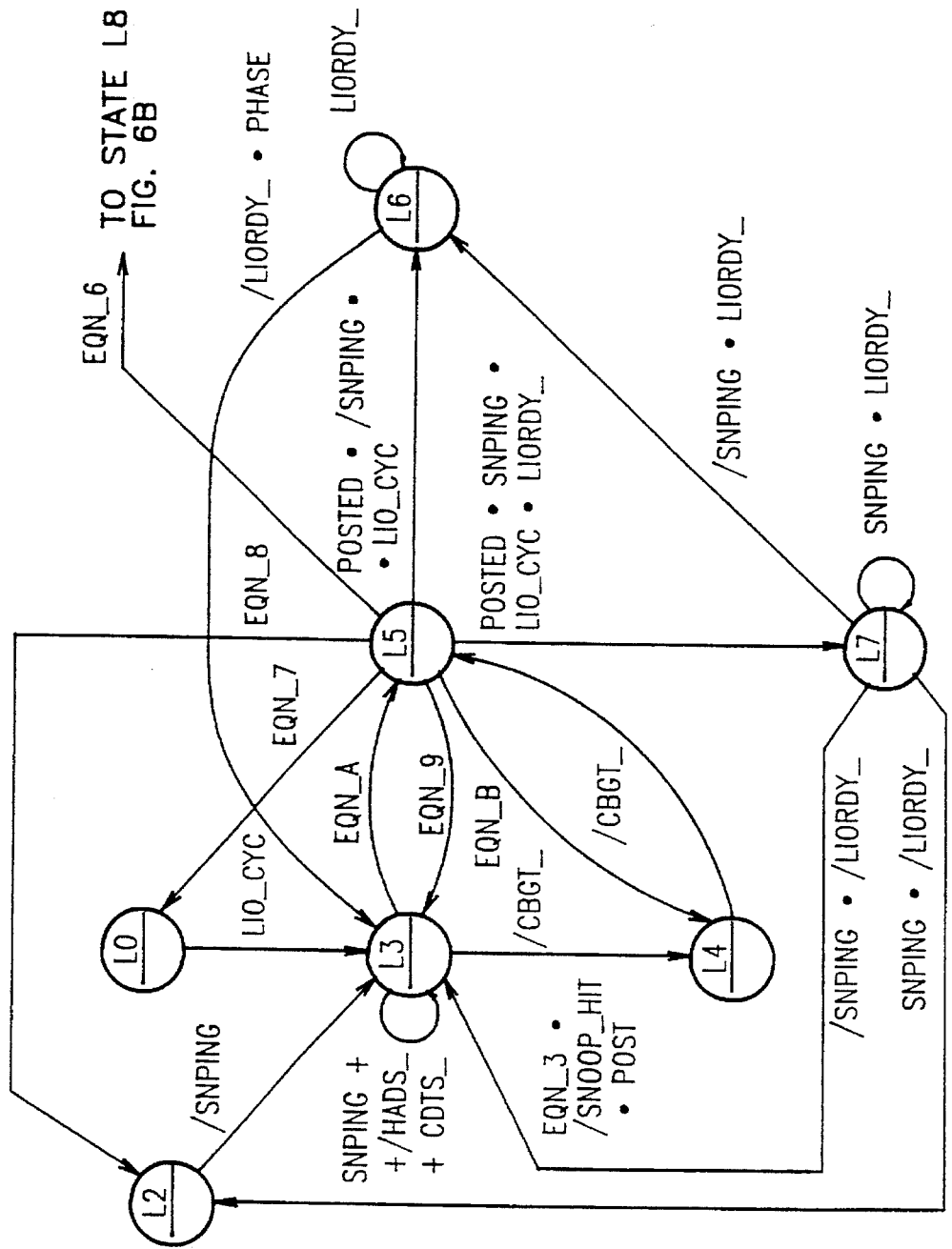
FIGS. 6A and 6B are state transition diagrams illustrating operation of the local I/O logic of FIG. 3.
Figure 6B:
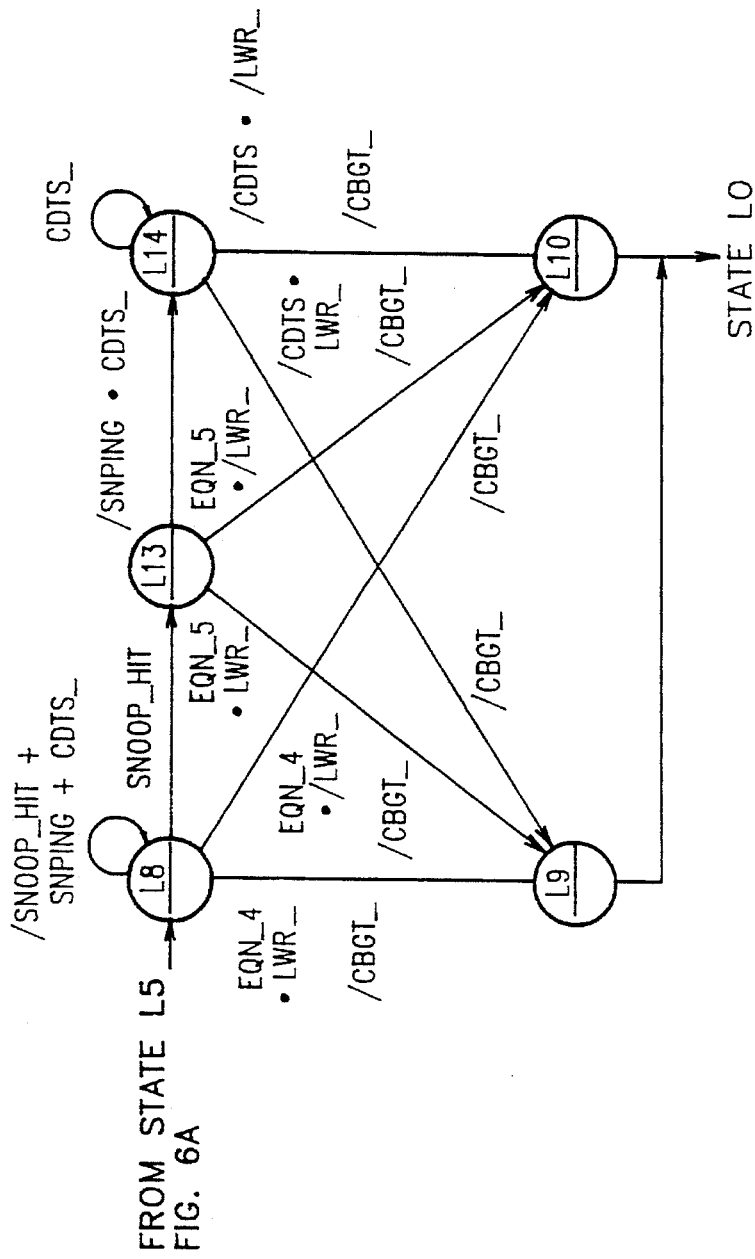

Referring now to FIGS. 6A and 6B, a state transition diagram illustrating operation of a state machine referred to as the local I/O state machine is shown. This state machine controls the operations of the local I/O bus 125. States in this state machine that are not relevant to the present invention have been omitted for clarity and brevity. A brief review of the signals used in this state machine is deemed appropriate.

A signal referred to as LIORDY_ is a local I/O bus ready signal that indicates completion of a local I/O cycle.

A signal referred to as LIO_CYC indicates that a local I/O cycle is beginning.

A signal referred to as POSTABLE indicates that the cycle is a write cycle that can be posted.

A signal referred to as POST_FULL indicates that the posting buffer is full.

A signal referred to as EMPTY indicates that the posting buffer is empty.

A signal referred to as POSTED indicating that a write cycle has been posted. When negated, the /POSTED signal indicates that the cycle is either non-postable or is an otherwise postable write cycle that has not yet been posted.

The following equations are used in FIG. 6 for clarity:
EQN_3=/SNPING•HADS_•/CDTS_
EQN_4=/CDTS•/SNPING•CSNPBSY_
EQN_5=/SNPING•PHASE•/CDTS_
EQN_6=/POSTABLE•/LIORDY_
EQN_7=POSTED•/LIORDY_
EQN_8=POSTED•SNPING•/LIORDY•LIOCYC
EQN_9=POSTABLE•/POST_FULL•/SNPING•/LIORDY_•LIO_CYC
EQN_A=EQN_3•(SNOOP_HIT+/POSTED)
EQN_B=POSTABLE•EMPTY The state machine begins in state L0, and all states lead to this state upon a system reset. The state machine transitions on the rising edge of the PCLK signal. The state machine advances from state L0 to state L3 when a local I/O cycle is begun, signified by the LIO_CYC signal being asserted. This may be either a local I/O read or local I/O write cycle. The state machine remains in state L3 while the equation:

$$SNPING+HADS\_+CDTS\_$$

is true. Thus, the state machine remains in state L3 if the cache controller 108 is either snooping the host bus, or a processor 102 has generated a cycle onto the host bus 24 that may be required to be snooped, or the processor data path is not available. The state machine advances from state L3 to state L4 when the equation:

$$/SNPING•HADS\_•/CDTS\_•/SNOOP\_HIT•POSTW$$

is true. Thus, the state machine advances from state L3 to state L4 on a postable write cycle when the cache controller 108 is not snooping a host bus cycle, a snoop write hit has not occurred, no new host bus cycle has been generated, and the processor data path is available.

In state L3 when the subsequent cycle is determined to be state L4, the CBGT_ signal is asserted, indicating for the first time to the cache controller 108 that the cycle may begin. By delaying the assertion of the CBGT_ signal until the transition from state L3 to state L4, the non-snoop window is reduced. The state machine advances from state L4 to state L5 on the next HCLK signal cycle. In state L5, the state machine returns to state L0 when the posted write cycle actually completes, meaning that the data is actually transferred to the DSP 126. This is signified by the equation:

$$POSTED•/LIORDY\_$$

Therefore, the transition from state L0 to L3 to L4 to L5 and back to L0 occurs on a posted local I/O write cycle where no snooping cycles are required and the posted write actually completes to the DSP 126 before any new local I/O cycles are generated.

The state machine transitions from state L3 to state L5 if the cycle is not postable, i.e., either the cycle is a read cycle a non-postable write cycle, or an otherwise postable write cycle where the posting buffer is full, or a snoop hit occurs. This is signified by the equation:

$$EQN\_3•(SNOOP\_HIT+/POSTED)$$

The state machine returns from state L5 to state L3 if the equation:

$$POSTABLE•POST\_FULL•/SNPING•LIORDY\_LIO\_CYC$$

is true. Thus, if the cycle is a postable write cycle, the state machine returns from state L5 to state L3 when the LIORDY_ signal is asserted, indicating that a prior local I/O cycle has completed, thus freeing up the posting buffer.

The state machine advances directly from state L5 to state L4 when the equation:

POSTABLE•EMPTY is true. Thus, the state machine returns from state L5 directly to state L4 if the cycle is a postable write and the posting buffer is empty. The CBGT_ signal is asserted in state L5 when the next transition is from state L5 to state L4.

If a postable write cycle completes posting in state L5, the cache controller 108 is not snooping, and a new local I/O cycle begins, the state machine advances from state L5 to state L6, signified by the equation:

POSTED•/SNPING•LIO_CYC

In state L6, the state machine waits for the write cycle to actually complete at the DSP 126. When the cycle completes, the state machine returns from state L6 to state L3. This is signified by the equation:

/LIORDY_•PHASE

After reaching state L3 from state L6, the state machine then advances to either state L4 or state L5 depending on the new cycle type.

As previously noted, the state machine also advances from state L3 to state L5 due to a snoop hit occurring in the cache system. The state machine advances from state L5 to state L7 if a new local I/O cycle has begun, the current cycle is a postable write cycle that has been posted but has not completed to the DSP 126, and the cache controller 120 is snooping, signified by the equation:

POSTED•SNPING•LIO_CYC•LIORDY_

The state machine remains in state L7 while the cache controller 108 is snooping and the current cycle has not completed, signified by the equation:

SNPING•LIORDY_

The state machine advances from state L7 to state L6 if the cache controller 108 completes snooping before the current cycle completes, signified by the equation:

/SNPING•LIORDY_

The state machine returns from state L7 to state L3 if the snoop cycle completes and the LIORDY_ signal is asserted, indicating that the current local I/O cycle has completed. This is signified by the equation:

/SNPING•/LIORDY_

The state machine advances from state L7 to state L2 if the cache controller 108 is still snooping on the next HCLK signal cycle and the current cycle has completed, signified by the equation:

SNPING•/LIORDY_

The state machine remains in state L2 while the cache controller 108 is snooping the current host bus cycle. This may involve a write-back cycle due to a snoop hit. The state machine returns from state L2 to state L3 when the cache controller 108 completes snooping.

The state machine advances from state L5 directly to state L2 if a new local I/O cycle has begun, the current cycle is a postable write cycle that has completed to the DSP 126, and the cache controller 120 is snooping, signified by the equation:

POSTED•SNPING•LIO_CYC•/LIORDY_

The state machine returns from state L2 to state L3 when the cache controller 120 completes snooping.

Therefore, the normal flow for a posted local I/O write cycle is L0→L3→L4→L5. From state L5, the state machine transitions to either state L0, L6 or L3, depending on whether a new local I/O cycle issues before the current cycle completes. A snoop cycle requires use of states L7 and L2. Thus, on local I/O write cycles the local I/O logic 148 delays assertion of the CBGT_ signal until the write cycle is either posted for a postable cycle or until the write cycle actually completes for a non-postable write. This allows a longer period of host bus snooping and increases host bus utilization.

If the cycle is a read cycle or non-postable write cycle, the state machine advances from state 5 to state L8 (FIG. 6B), signified by the equation:

/POSTABLE•/LIORDY_ being true, which is when the current local I/O cycle finishes. On a read cycle, the asserted LIORDY_ signal indicates that the read data has been returned from the DSP 126 to the cache data buffer 124. On a non-postable write cycle, the asserted LIORDY_ signal in state L5 indicates that the write operation has completed at the DSP 126.

If the cycle is a read cycle, the state machine advances from state L8 to state L10 to complete the respective read cycle when the cache data path is available and the cache controller 120 is not snooping, signified by the equation:

EQN_4 •/LWR_

The CBGT_ signal is asserted in state L8 when the next state of the state machine is state L10. By delaying the assertion of the CBGT_ signal until state L8, after the read data has been returned to the cache data buffer 124 and the cache memory data path is available, the non-snoop window is reduced. Upon completion of the cycle, the state machine then returns to state L0.

The state machine advances from state L8 to state L9 to complete a non-postable write cycle, signified by the equation:

EQN_4 •LWR_

Since in this instance the cycle is a write cycle that has already completed, the asserted CDTS signal in EQN_4 is not a significant condition for this state transition.

The CBGT_ signal is asserted in state L8 when the next state of the state machine is state L9. By delaying the assertion of the CBGT_ signal until state L8, after the non-postable write cycle has completed, the non-snoop window is reduced. In state L9, various other ready signals are returned to complete the cycle, and the state machine returns to state L0.

The state machine advances from state L8 to state L13 if a snoop hit occurs to the cache controller 108, signified by the SNOOP_HIT signal being asserted. The state machine remains in state L13 while the SNPING signal is asserted, which for a snoop hit to a dirty line in the cache memory 110 is while the write-back cycle is being performed.

If the cache controller 108 completes snooping and the cache memory data path is available, the state machine advances to either states L10 or L9, depending on whether the cycle is a read or write cycle, respectively. These transitions are signified by the equations:

EQN_5 •/LWR_ to advance to state L10 for a read cycle and

EQN_5 •LWR_ to advance to state L9 for a write cycle. The CBGT_ signal is asserted in state L13 when the next state transition is to either states L9 or L10. By delaying assertion of the CBGT_ signal until after the snoop operations complete, the non-snoop window is reduced.

If the cache controller 108 completes snooping and the cache memory data path is not yet available, the state machine advances to state L14, signified by the equation:

/SNPING•CDTS_

The state machine remains in state L14 until the data path is available. When the cache memory data path is available, the state machine advances to either states L10 or L9, depending on whether the cycle is a read or write cycle, respectively. These transitions are signified by the equations:

/CDTS_•/LWR_ to advance to state L10 for a read cycle and

/CDTS_•LWR_ to advance to state L9 for a write cycle. The CBGT_ signal is asserted in state L14 when the next state transition is to either states L9 or L10. Again, by delaying assertion of the CBGT_ signal, the non-snoop window is reduced.

Therefore, the cache interface logic 120 asserts the associated local I/O control signals to the cache data buffer 124 once it has determined that a local I/O access is required. The cache data buffer 124 then carries out the read operation in concert with the DSP 126. Meanwhile, the cache controller 108 is free to snoop host bus transfers since the CBGT_ signal was never asserted by the cache interface logic 120 and the cache interface logic 120 no longer needs the cache controller address.

Once local I/O read is completed, the cache data buffer 124 responds by asserting the LIORDY_ signal to indicate to the cache interface logic 120 that the read data is available in the cache data buffer 124. The cache interface logic 120 then asserts the CBGT_ signal to indicate to the cache controller 108 that it plans on completing the transfer. From this point on until the completion of the local I/O read, the cache controller 108 is unable to snoop host bus transfers, and the cache interface logic 120 must assert the HPAUSE_ signal if a host bus cycle is detected to a snoopable and cacheable address. The cache interface logic 120 completes the cycle by transferring the read data from the cache data buffer 124 into the cache memory 110 and asserting the CRDY_ signal to the cache controller 108 to complete the cycle.

If a snoop hit occurs while waiting for the local I/O read data, the cache controller 108 initiates the write-back to memory. The cache interface logic 120 responds with the appropriate control to complete the transfer. Local I/O state machine monitors the LIORDY_ signal so that the cache interface logic 120 knows that the read data is available when the write-back is completed. Once the write-back is complete, the cache controller 108 re-issues the local I/O access. The cache interface logic 120 enables the obtained local I/O read data onto the cache memory data bus. Since the cache data buffer 124 has already asserted LIORDY_, the cache interface logic 120 asserts the CBGT_ signal to the cache controller 108 and completes the transfer by clocking the data into the cache memory 110 and asserting the CRDY_ signal. Once the CBGT_ signal is asserted, all cacheable and snoopable host bus cycles are delayed using HPAUSE_ so that the cache controller 108 will be able to snoop them once it has competed the current local I/O transfer.

Therefore, a method and apparatus for reducing the non-snoop window during expansion bus read cycles and as well as local I/O cycles is disclosed. The present invention thus allows a longer period of host bus snooping and increases host bus utilization.

The foregoing disclosure and description of the invention are illustrative and explanatory thereof, and various changes in the size, shape, materials, components, and circuit elements, as well as in the details of the illustrated circuitry and construction and method of operation may be made without departing from the spirit of the invention.

We claim:

1. A computer system including a cache controller non-snoop window reduction feature, comprising:

a host bus;

a processor coupled to said host bus;

a bus master coupled to said host bus;

an expansion bus coupled to said host bus;

expansion bus memory storing data coupled to said expansion bus;

a cache system coupled between said host bus and said processor, said cache system including a cache controller and cache memory, wherein said cache controller requires a bus grant signal to perform cycles to said host bus, wherein said cache controller snoops said host bus when said cache controller does not control said host bus but cannot snoop said host bus after said bus grant signal is asserted during a cycle until said cycle completes;

cycle generation means coupled to said cache system and said host bus for generating an expansion bus read cycle when said processor requests data residing in said expansion bus memory and not residing in said cache memory without providing said bus grant signal to said cache controller;

an expansion bus controller coupled between said host bus and said expansion bus, said expansion bus controller receiving said expansion bus read address and obtaining said requested data from said expansion bus memory, said expansion bus controller presenting said requested data onto said host bus; and non-snoop window reduction means coupled to said host bus and said cache controller for providing said bus grant signal to said cache controller after said expansion bus controller presents said requested data onto said host bus, whereupon said cache controller obtains said requested data from said host bus and completes said expansion bus read cycle.

2. The computer system of claim 1, wherein said cycle generation means comprises:

latching means coupled to said cache controller and said host bus for latching an address generated by the cache controller during an expansion bus read cycle; and presenting means coupled to said latching means for presenting said expansion bus read address onto said host bus.

3. The computer system of claim 1, wherein said cache controller is the Intel 82495 cache controller.

4. A computer system including a cache controller non-snoop window reduction feature, comprising:

a host bus;

a processor coupled to said host bus;

a bus master coupled to said host bus;

a plurality of processor ports storing data;

a local input/output bus coupled between said processor and said processor ports;

a cache system coupled between said local input/output bus and said processor and further coupled between said processor and said host bus, said cache system including a cache controller and cache memory, wherein said cache controller requires a bus grant signal to perform operations on the local input/output bus, wherein said cache controller snoops said host bus when said cache controller does not control said host bus but cannot snoop said host bus after said bus grant signal is asserted during a local I/O cycle until said local I/O cycle completes;

cycle generation means coupled to said cache system and said local I/O bus for generating a local I/O cycle when said processor generates a cycle accessing one of said processor ports and said processor port access cannot be satisfied by said cache memory without providing said bus grant signal to said cache controller; and non-snoop window reduction means coupled to said local I/O bus and said cache controller for delaying provision of said bus grant signal when said local I/O cycle is generated and for providing said bus grant signal to said cache controller after said local I/O cycle is in progress.

5. The computer system of claim 4, wherein said local I/O cycle is a read cycle requesting data from one of said processor ports, the computer system further comprising:

a data buffer coupled between said cache memory and said processor ports which receives said requested data from said processor ports, said data buffer presenting said requested data onto said local I/O bus; and wherein said non-snoop window reduction means provides said bus grant signal to said cache controller when said data buffer receives said requested data and access to said cache memory from said data buffer is available.

6. The computer system of claim 4, wherein said local I/O cycle is a write cycle writing data to one of said processor ports, wherein said non-snoop window reduction means provides said bus grant signal to said cache controller after said write data reaches said processor ports.

7. The computer system of claim 6, wherein said local I/O cycle is a postable write cycle writing data to one of said processor ports, the computer system further comprising:

a data buffer coupled between said cache memory and said processor ports which receives said write data from said cache memory; and wherein said non-snoop window reduction means provides said bus grant signal to said cache controller immediately before said write data reaches said data buffer.

8. The computer system of claim 4, wherein said cycle generation means comprises:

latching means coupled to said cache controller and said local I/O bus for latching an address generated by the cache controller during a local I/O bus cycle; and presenting means coupled to said latching means for presenting said local I/O bus address onto said local I/O bus.

9. A method for reducing a cache controller non-snoop window in a computer system comprising a host bus, a processor coupled to the host bus, a bus master coupled to the host bus, a cache system coupled between the host bus and the processor, which cache system includes a cache controller that requires a bus grant signal to perform operations on the host bus, wherein said cache controller cannot snoop the host bus after said bus grant signal is asserted during a cycle until the cycle completes, an expansion bus coupled to the host bus, an expansion bus controller coupled between the host bus and the expansion bus, and cache interface logic which delays assertion of said bus grant signal, the method comprising:

a) the cache controller generating an expansion bus read cycle including an address of requested data;

b) the cache interface logic latching said address;

c) the cache interface logic presenting said address onto the host bus;

d) the expansion bus controller receiving said expansion bus read cycle address;

e) the expansion bus controller presenting said requested data onto the host bus;

f) the cache interface logic asserting the bus grant signal to the cache controller during execution of step e); and g) the cache controller obtaining said requested data from the host bus after step f).

10. A method for reducing a cache controller non-snoop window in a computer system comprising a host bus, a processor coupled to the host bus, a bus master coupled to the host bus, a plurality of processor ports storing data, a local input/output bus coupled between the processor and the processor ports, a cache system coupled between the local input/output bus and the processor and further coupled between the processor and the host bus, the cache system including a cache controller and cache memory, wherein said cache controller requires a bus grant signal to perform cycles to the host bus, wherein said cache controller snoops said host bus when said cache controller does not control said host bus but cannot snoop said host bus after said bus grant signal is asserted during a local I/O cycle until said local I/O cycle completes, and cache interface logic which delays assertion of said bus grant signal, the method comprising:

a) the cache controller generating a local I/O bus cycle including an address;

b) the cache interface logic latching said address;

c) the cache interface logic presenting said address onto the local I/O bus to begin said local I/O bus cycle; and d) the cache interface logic delaying provision of said bus grant signal when said local I/O cycle is generated and providing said bus grant signal to said cache controller after said local I/O cycle is in progress.

* * * * *